(12) United States Patent
Nakayama

(10) Patent No.: US 6,677,924 B2
(45) Date of Patent: Jan. 13, 2004

(54) LIQUID CRYSTAL DATA DISPLAY DEVICE

(75) Inventor: Junichiro Nakayama, Tajimi (JP)

(73) Assignee: Sharp Kabushiki Kaisha, Osaka (JP)

( * ) Notice: Subject to any disclaimer, the term of this patent is extended or adjusted under 35 U.S.C. 154(b) by 304 days.

(21) Appl. No.: 09/804,027

(22) Filed: Mar. 13, 2001

(65) Prior Publication Data

US 2001/0020989 A1 Sep. 13, 2001

(30) Foreign Application Priority Data

Mar. 13, 2000 (JP) .......................................... 2000-068968

(51) Int. Cl.$^7$ ................................................. G09G 3/36
(52) U.S. Cl. .......................................... 345/92; 345/147
(58) Field of Search ............................ 349/61; 345/147, 345/92

(56) References Cited

U.S. PATENT DOCUMENTS 6,271,825 B1 * 8/2001 Greene ..................... 345/147
6,335,716 B1 * 1/2002 Yamazaki et al. ............ 345/92

OTHER PUBLICATIONS

Birendra Bahadur, "Liquid Crystals" Applicantions and Uses, vol. 2. ISBN 981–02–0111–7: pp. 78–80.*

* cited by examiner

Primary Examiner—Nathan J. Flynn
Assistant Examiner—Andre C Stevenson
(74) Attorney, Agent, or Firm—Birch, Stewart, Kolasch & Birch, LLP

(57) ABSTRACT

A liquid crystal data display device has a liquid crystal panel unit, and a backlight unit is further equipped with an illuminometer for measuring ambient illuminance. Panel brightness Bp (cd/m$^2$) is done by using an equation Bp=a×ln (I)+b when ambient illuminance is I (1x), wherein 10<a<340, and 50<b<250.

11 Claims, 17 Drawing Sheets

(a)

(b)

(c)

(a)

(b)

(c)

(a)

(b)

(c)

(a)

(b)

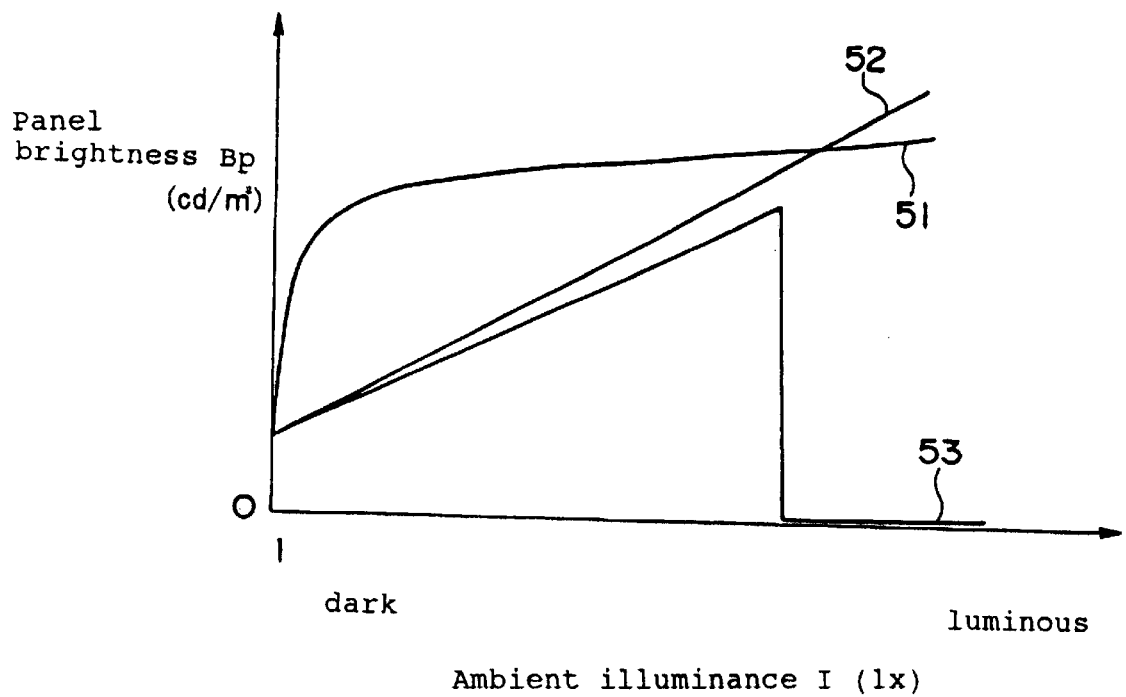

LIQUID CRYSTAL DATA DISPLAY DEVICE

FIELD OF THE INVENTION

The present invention relates to a liquid crystal data display device, and especially, to a TFT liquid crystal data display device or a PALC display device and the like.

DESCRIPTION OF THE RELATED ART

The liquid crystal data display device represented by the liquid crystal display is being widely spread to the PC monitor market and the television market with its advantages as a thin, low-power-consumption display, along with the advance in technologies enabling the display to provide a high-speed-movement picture on a full-color wide screen.

One typical liquid crystal display is a transmission-type TFT liquid crystal display, the outline of which is now explained with reference to FIGS. 16, 17 and 18. As shown in FIG. 16, the TFT liquid crystal display comprises a color filter comprising pixels 11 including red, green, blue, and black masks, and a common electrode 12, a TFT substrate including a drive electrode 13 and a thin-film transistor 14 for applying voltage and thereby driving the liquid crystal, and a liquid crystal material 15 injected between the TFT substrate and the color filter. Moreover, polarizing plates 16 are placed on the front and back sides of the panel, and the shutter function of liquid crystal material 15 transmits or blocks light. Further, as shown in the cross-sectional view of FIG. 17 (a), a backlight unit 18 radiates light evenly on the whole surface of the liquid crystal panel 17. FIGS. 17 (b) and 17 (c) are the back view and the side view of FIG. 17 (a). The liquid panel 17 is mounted in a body 19 together with the backlight unit 18, thereby forming the liquid crystal display.

Next, the operation of the TFT is explained. Similar to a general transistor, the TFT comprises a source S, a gate G and a drain D. At the OFF state, as shown in FIG. 18 (a), no voltage is applied to the liquid crystal, and at the ON state, as shown in FIG. 18 (b), voltage VG is applied between the gate/drain of the liquid crystal.

Moreover, an edge (or side) type light or a subjacent (directly below) type light is known as the backlight unit. The edge light type is used mainly for office appliances (such as a laptop PC), and on the other hand, the subjacent type is mainly used for a mid- to small sized audiovisual equipment requiring higher brightness. Recently, there are greater demands for a more thinner, increased-brightness display, and improved fluorescent lamps and light conducting plates are being developed to match these demands, along with which the mid- to small sized audiovisual equipment are switched more from the subjacent type light to the edge-light type backlight unit. However, in a large-sized display of size 20 and larger, the subjacent-type light is more advantageous since the weight of the light conducting plate is too heavy.

Moreover, Japanese Patent Laid-Open Publication Nos. 11-73122 and 11-95215 disclose a liquid crystal data display device having an external light intake window and an optical detector, which is capable of varying the power to the backlight unit corresponding to the amount of external light, and to radiate light to the panel unit using both the backlight and the external light to improve the brightness while reducing power consumption of the display.

However, in the above-mentioned liquid crystal data display device, the brightness is not controlled actively corresponding to ambient illuminance. Moreover, there is a mechanism in some CRT devices to modify the brightness of the screen by controlling the strength of the image signals according to the ambient illuminance. However, in the case of a liquid crystal data display device, the light source and the image signals are controlled separately, so it was impossible to apply the same technique to the liquid crystal display.

Japanese Patent Laid-Open Publication Nos. 6-331962, 9-146073 and 10-170914 propose controlling the brightness of the back light in relation to the external light. The technology proposed in these publications are characterized in increasing the brightness of the backlight as the ambient illuminance increases, as shown in the characteristic curve 52 of FIG. 19. Further, Japanese Patent Laid-Open Publication No. 6-18880 proposes controlling the backlight to turn off when the ambient illuminance is sufficiently bright, as shown in the characteristic curve 53.

However, the former-mentioned prior art method had drawbacks in that the power consumption of the display is increased more and more, and the life of the backlight is thereby reduced. Moreover, according to the latter-mentioned prior art method, the power consumption is reduced if the ambient illuminance is sufficiently high, but when the backlight is turned off, the display suddenly became dark even when the illuminance is sufficient, making the display hard to see.

SUMMARY OF THE INVENTION

The present invention solves the problems of the prior art technology. The present invention aims at providing a liquid crystal data display device that is capable of providing appropriate brightness to the liquid crystal panel while reducing the power consumption thereof and improving the life of the backlight unit.

The present invention provides a liquid crystal data display device comprising a liquid crystal panel unit and a backlight unit, further comprising: an illuminometer for measuring ambient illuminance; and a means for computing panel brightness Bp ($cd/m^2$) based on the following equation when the ambient illuminance is I (1x):

$$Bp = a \times \ln(I) + b$$

wherein $10 \leq a \leq 40$, and $50 \leq b \leq 250$.

Moreover, the present invention provides a liquid crystal data display device, wherein the backlight unit is controlled so that the panel brightness is set to the optimum value corresponding to the ambient illuminance.

Further, the present invention provides a liquid crystal data display device, wherein the backlight unit is controlled so that the panel brightness is adjusted stepwise to the optimum value corresponding to the ambient illuminance.

Even further, the present invention provides a liquid crystal data display device further comprising when the panel brightness is represented by Bp ($cd/m^2$) and the ambient illuminance is represented by I (1x), a means for classifying I into $1 \leq I < 100$, $100 \leq I < 1,000$, $1,000 \leq I < 10,000$, and $10,000 \leq I < 100,000$ (1x); computing the Bp value at both end points (start point and end point) of each class by $Bp = a \times \ln(I) + b$, wherein $10 \leq a \leq 40$ and $50 \leq b \leq 250$; and computing the average value of these values to obtain the Bp value of each class.

The present invention provides a liquid crystal data display device further equipped with a function for controlling the backlight unit so as to obtain a fixed panel brightness, and a function for controlling said backlight unit so that the panel brightness is set to the optimum value corresponding to the ambient illuminance, the device comprising a switch for selecting these two functions.

Moreover, the present invention provides a liquid crystal data display device further comprising a plural number of illuminometers, and a means for controlling the backlight unit so as to obtain a substantially uniform panel brightness throughout the screen.

Further, the present invention provides a liquid crystal data display device further comprising an external light intake window, and a means for controlling the backlight unit.

Even further, the present invention provides a liquid crystal data display device wherein the external light intake window is a prismatic light conducting plate.

Further, the present invention provides a liquid crystal data display device wherein the external light intake window is a half-mirror.

The present invention provides a liquid crystal data display device further comprising illuminometers mounted to the front surface and the back surface thereof for measuring the front-side ambient illuminance and the back-side ambient illuminance respectively, and a means for computing the panel brightness based on the front-surface ambient illuminance and controlling the backlight unit to obtain the desired panel brightness based on the back-surface ambient illuminance.

The present invention provides a liquid crystal data display device further comprising a plural number of liquid crystal panels, backlight units, the number of which is equal to or smaller than the number of the liquid crystal panels, and external light intake windows, the number of which is equal to or smaller than the number of the liquid crystal panels.

The operation according to the present invention will now be explained. According to the present invention, the relation of the ambient illuminance and the panel brightness is set as shown by the characteristic curve 51 of FIG. 19, wherein the panel brightness is controlled so as to increase logarithmically corresponding to the ambient illuminance. In other words, when the ambient illuminance is low (dark), the brightness of the backlight is increased logarithmically, so the brightness of the display is improved compared to the linear control offered by the prior art. Moreover, as the ambient illuminance increases, the brightness of the panel can be controlled to a soft brightness, which prevents the increase of power consumption of the backlight and improves the life of the backlight.

BRIEF DESCRIPTION OF THE DRAWINGS

FIG. 19 is an explanatory view showing the characteristic curve of the relation between the ambient illuminance and the panel brightness of the liquid crystal data display device.

DETAILED DESCRIPTION OF PREFERRED EMBODIMENTS

The preferred embodiment of the present invention will now be explained.

Figure 1:
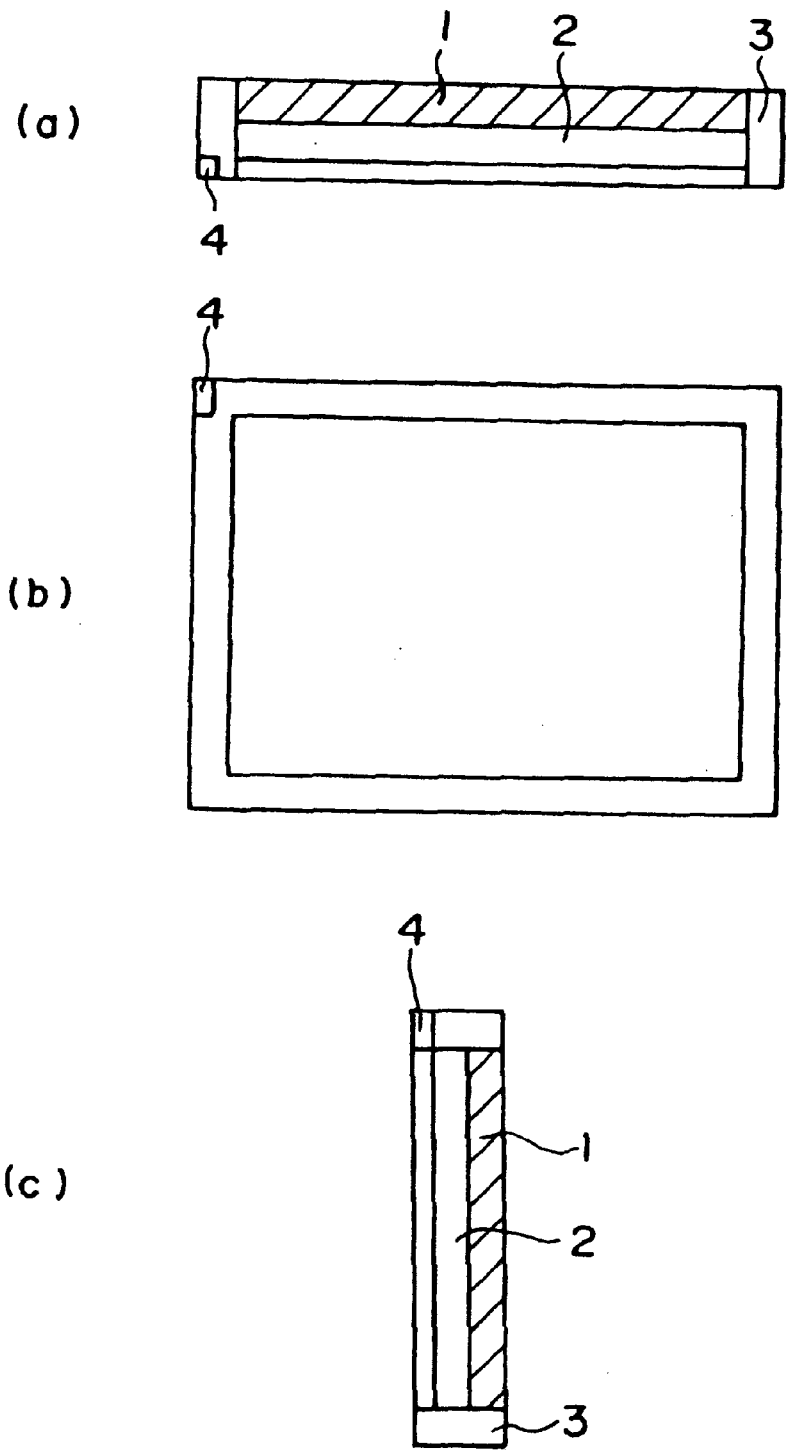
FIG. 1 is a simplified diagram of the liquid crystal data display device according to embodiment 1.

Embodiment 1 will be explained. Embodiment 1 of the present invention will be explained with reference to FIG. 1. As shown in cross-section in FIG. 1, the liquid crystal display according to embodiment 1 comprises a liquid crystal panel 1 including a color filter, a TFT substrate, a liquid crystal material and a polarizing plate, a backlight unit 2, and a body 3. FIGS. 1 (b) and 1 (c) are a back view and a side view of FIG. 1 (a). A body 3 is equipped with an illuminometer 4, and a means for computing the best panel brightness corresponding to the ambient illuminance, thereby controlling the backlight unit 2.

Figure 2:
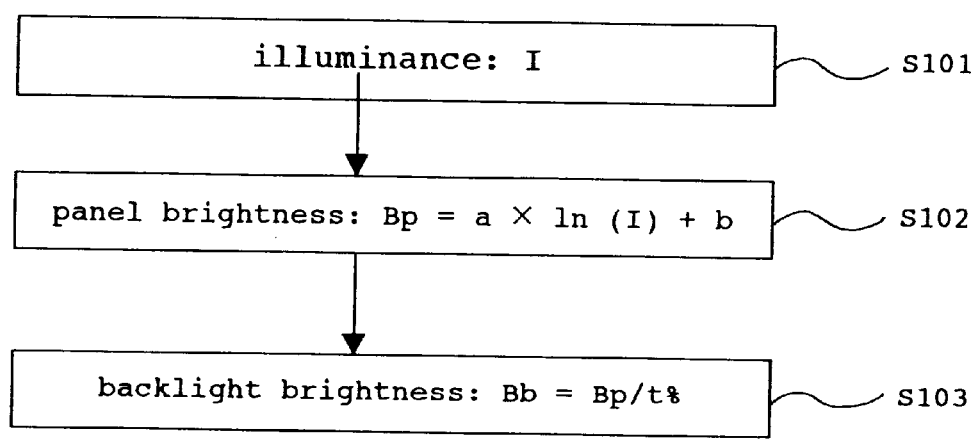
FIG. 2 is an explanatory view of the algorithm for controlling the backlight unit according to embodiment 1.

Referring now to FIG. 2, the algorithm for determining the backlight brightness Bb based on the illuminance I measured using the illuminometer 4 is explained.

In S101, the illuminometer 4 measures the ambient illuminance, and obtains illuminance I.

In S102, the panel brightness Bp is computed based on the following equation; $Bp = a \times \ln(I) + b$, wherein $10 \leq a \leq 40$, and $50 \leq b \leq 250$.

In S103, the backlight brightness Bb is computed based on the following equation; $Bb = Bp/t\,\%$, wherein t is the panel transmittance (%). That is, when t %=5%, $Bb = Bp/0.05$.

Thereby, the optimal panel brightness Bp and the backlight brightness Bb are obtained.

Figure 3:
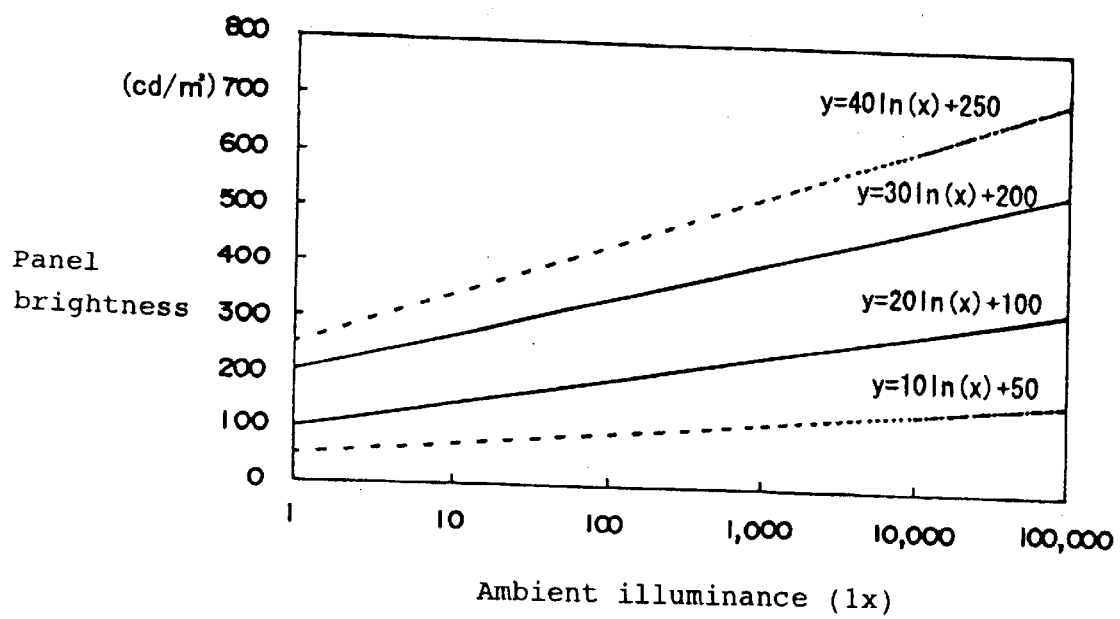
FIG. 3 is an explanatory view showing the relation between the ambient illuminance and the panel brightness of the liquid crystal data display device according to embodiment 1.

It is best according to embodiment 1 to compute the panel brightness Bp based on illuminance I so that the value is higher when the display is used in a luminous environment, and lower when it is used indoors or in a dark environment. The panel brightness Bp can be expressed by a linear equation of the logarithm of the illuminance as follows; $Bp = a \times \ln(I) + b$. An example of the relation between the ambient illuminance (1x) and the panel brightness (cd/m²) is shown in FIG. 3. When the display is used outdoors or in a luminous environment, the values of a and b are set high, and on the other hand, when the display is used indoors or in a dark environment, the values of a and b are set lower. Considering the life of the backlight unit and the like, value of "a" should be in the range of 10 through 40, and "b" in the range of 50 through 250. More preferably, a=20–30, and b=100–200.

Figure 4:
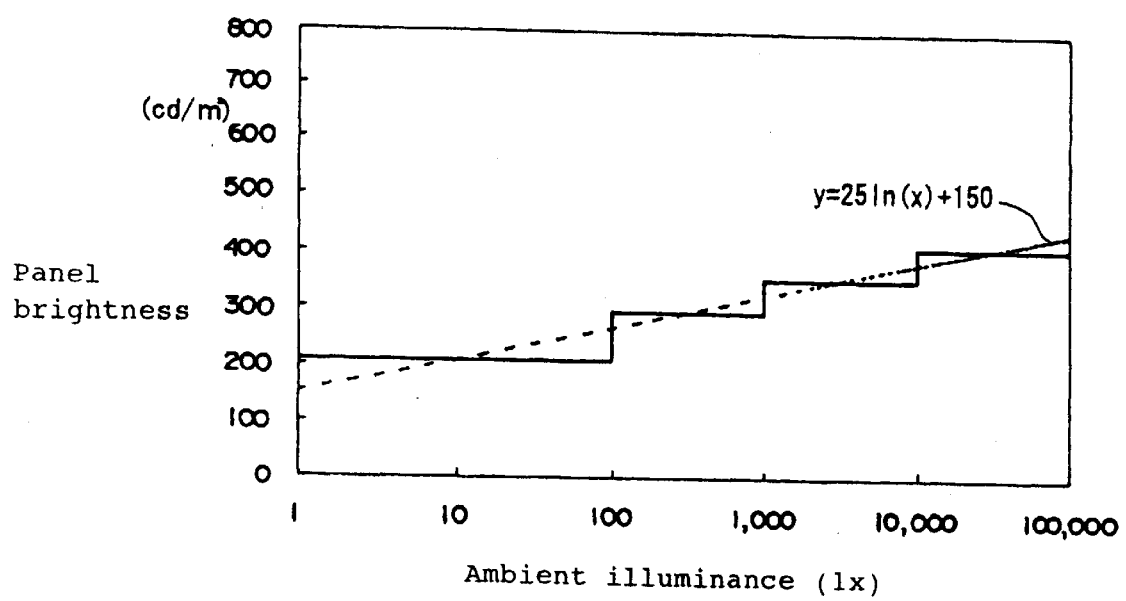
FIG. 4 is an explanatory view showing the second relation between the ambient illuminance and the panel brightness of the liquid crystal data display device according to embodiment 1.

Further, if it is difficult to switch the brightness of the backlight unit frequently, then as shown in FIG. 4, it is possible to set the panel brightness Bp to be switched stepwise according to the ambient illuminance. In the example, the illuminance is classified into the following classes; $1 \leq I < 100$, $100 \leq I < 1,000$, $1,000 \leq I < 10,000$, $10,000 \leq I < 100,000$ (1x), and the Bp value on both ends is obtained by $Bp = 25 \times \ln(I) + 150$, the average value thereof being set as the Bp value within each range.

According to the present invention, one illuminometer is mounted on the back side thereof, but the illuminometer can also be provided on the front side thereof, or a plurality of illuminometers can be provided on the front surface and utilized to control the backlight unit so that the panel brightness is uniform throughout the whole front surface.

The second embodiment of the present invention will now be explained. The second embodiment will be explained with reference to FIG. 5. The liquid crystal display according to embodiment 2 is the same as that explained in embodiment 1, so the explanation thereof is omitted.

Figure 5:
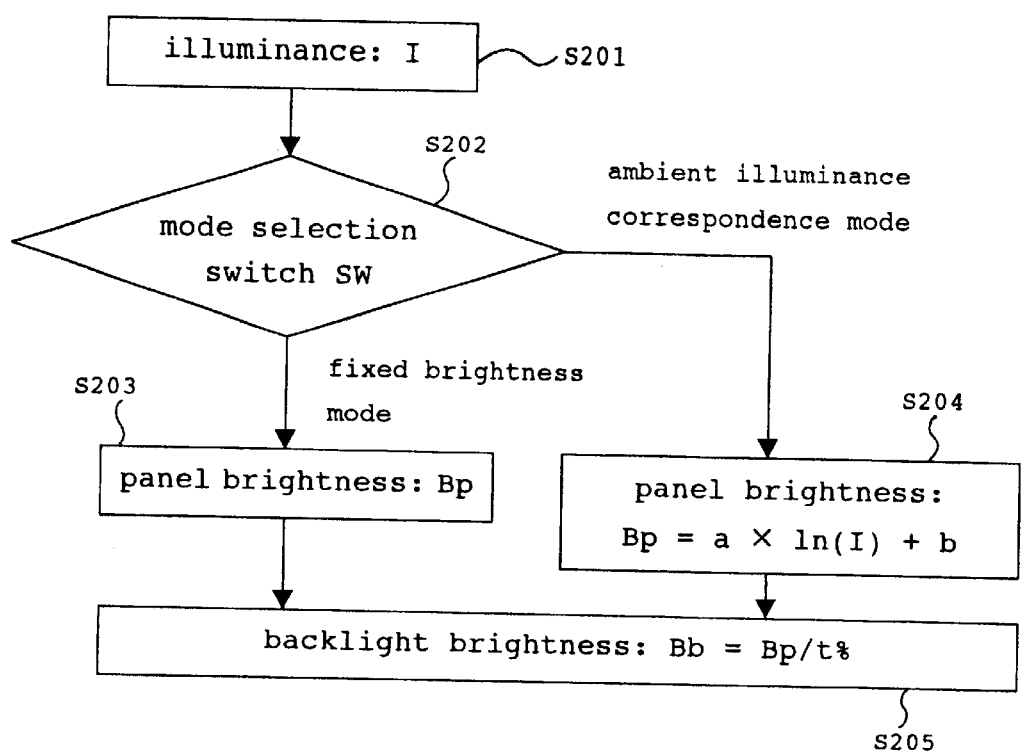
FIG. 5 is an explanatory view showing the algorithm for controlling the backlight unit according to embodiment 2.

FIG. 5 is referred to in explaining the algorithm for determining the backlight brightness Bb based on the illuminance I measured by the illuminometer 4.

In S201, the illuminometer 4 measures the ambient illuminance, and obtains illuminance I.

In S202, by use of the mode selection switch, when the mode is set to a fixed brightness mode, the procedure advances to S203, and when the mode is set to an ambient illuminance correspondence mode, the procedure advances to S204.

In S203, the panel brightness Bp is determined to a fixed value, and the procedure advances to S205.

In S204, the panel brightness Bp is computed based on $Bp = a \times \ln(I) + b$, wherein $10 \leq a \leq 40$ and $50 \leq b \leq 250$, and the procedure advances to S205.

In S205, the backlight brightness Bb is computed based on $Bb = Bp/t\%$. Thereby, the optimal panel brightness Bp and the backlight brightness Bb is obtained.

According to embodiment 2, the switch SW is switched based on the mode selected by the user, and the method for obtaining the Bb differs accordingly. When a fixed brightness mode is selected, the panel brightness Bp is determined to either a preset value or a value set by the user, and the backlight brightness Bb is obtained by dividing Bp by the panel transmittance t (%), then the backlight unit is controlled to the obtained Bb value. On the other hand, when the ambient illuminance correspondence mode is selected, the illuminance I is used to compute the Bp value so that it is higher when the device is used under a luminous environment and is lower when the device is used indoors or under a dark environment. Similar to the case of embodiment 1, Bp can be expressed by a linear equation of a logarithm of the illuminance; $Bp = a \times \ln(I) + b$. When used under a luminous atmosphere, the values of a and b are set higher, and when used indoors or under a dark atmosphere, the values of a and b are set lower. Further, if it is difficult to switch the brightness of the backlight unit frequently, Bp can be switched in a stepwise manner. The backlight brightness Bb is computed by dividing Bp by the panel transmittance t, and the backlight unit is controlled to the value of Bb.

Figure 6:
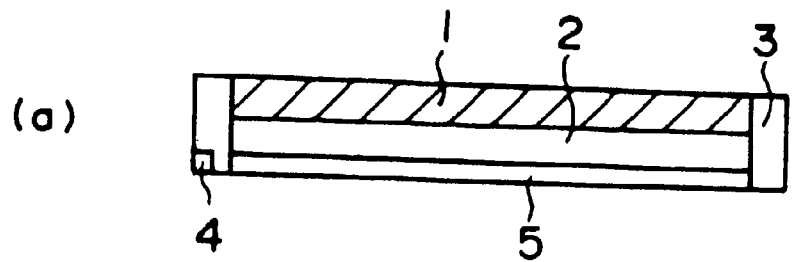
FIG. 6 is a simplified diagram showing the liquid crystal data display device according to embodiment 3.
Figure 6:
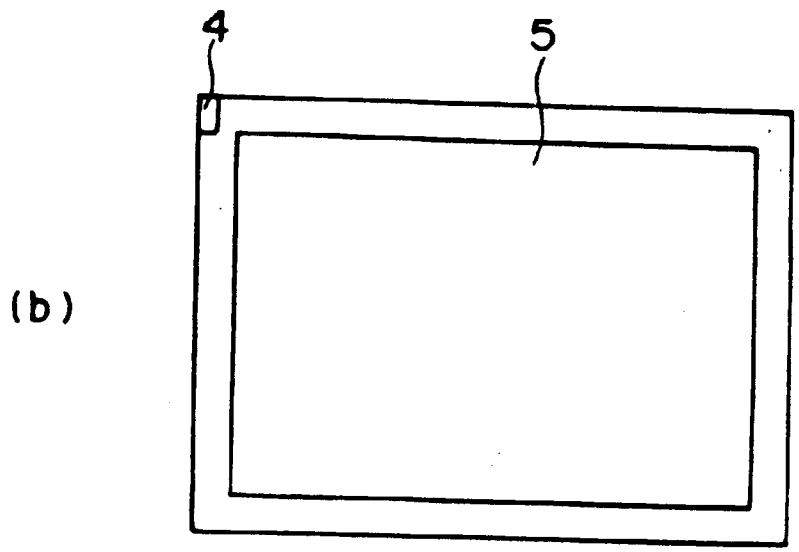
Figure 6:
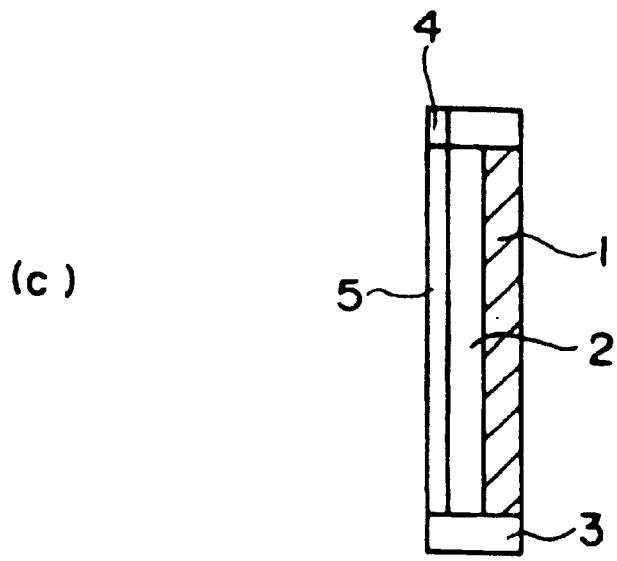

Embodiment 3 of the present invention will now be explained. Embodiment 3 will be explained with reference to FIG. 6. As shown in cross-section in FIG. 6 (a), the liquid crystal display according to embodiment 3 comprises a liquid crystal panel 1 including a color filter, a TFT substrate, a liquid crystal material and a polarizing plate, a backlight unit 2 and a body 3. An external light intake window 5 is provided to the body 3. FIGS. 6 (b) and 6 (c) are the back view and the side view of FIG. 6 (a). An illuminometer 4 is equipped to the body 3, which controls the backlight unit 2 so that the average panel brightness is at the optimum value corresponding to the ambient illuminance.

Figure 7:
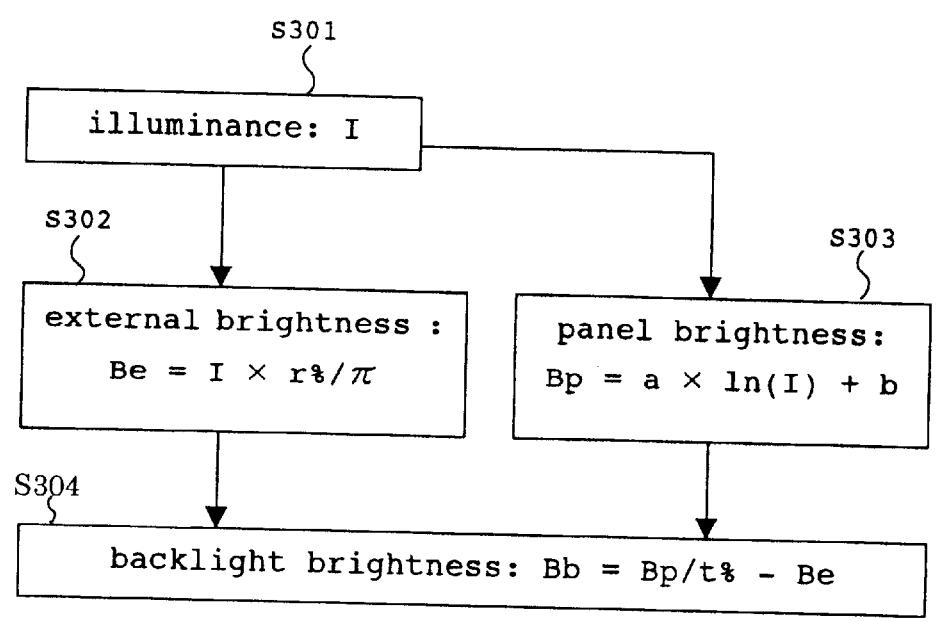
FIG. 7 is an explanatory view of the algorithm for controlling the backlight unit according to the embodiment.

FIG. 7 is used to explain the algorithm for determining the backlight unit brightness Bb from the illuminance I measured by the illuminometer 4.

In S301, the illuminometer 4 measures the ambient illuminance and obtains illuminance I.

In S302, the external brightness Be is computed by $Be = I \times r \%/\pi$.

In S303, the panel brightness Bp is computed by $Bp = a \times \ln(I) + b$, wherein $10 \leq a \leq 40$, and $50 \leq b \leq 250$.

In S304, the backlight brightness Bb is computed by $Bb = Bp/t\% - Be$. Thereby, the optimal panel brightness Bp and the backlight brightness Bb is obtained.

In embodiment 3, the external brightness Be is computed based on the illuminance I. Be is obtained by multiplying I with surface reflectivity r (%) and then dividing that by circular constant (the ratio of the circumference of a circle to its diameter) π. Reference r includes the transmittance when light passes through the external light intake window, and is determined by the material of the window. Next, the panel brightness Bp is computed based on illuminance I so that the value is higher when the display is used under a luminous environment, and is lower when the display is used indoors or under a dark environment. Bp can be expressed by a linear equation of the logarithm of the illuminance as follows; $Bp = a \times \ln(I) + b$, wherein a and b are higher when the display is used under a luminous environment, and lower when it is used indoors or under a dark environment. Further, if it is difficult to switch the brightness of the backlight unit frequently, Bp can be switched stepwise according to the illuminance. The backlight brightness Bb is obtained by dividing Bp by panel transmittance t (%) and then subtracting Be therefrom. The backlight unit is controlled to the value of Bb.

Figure 8:
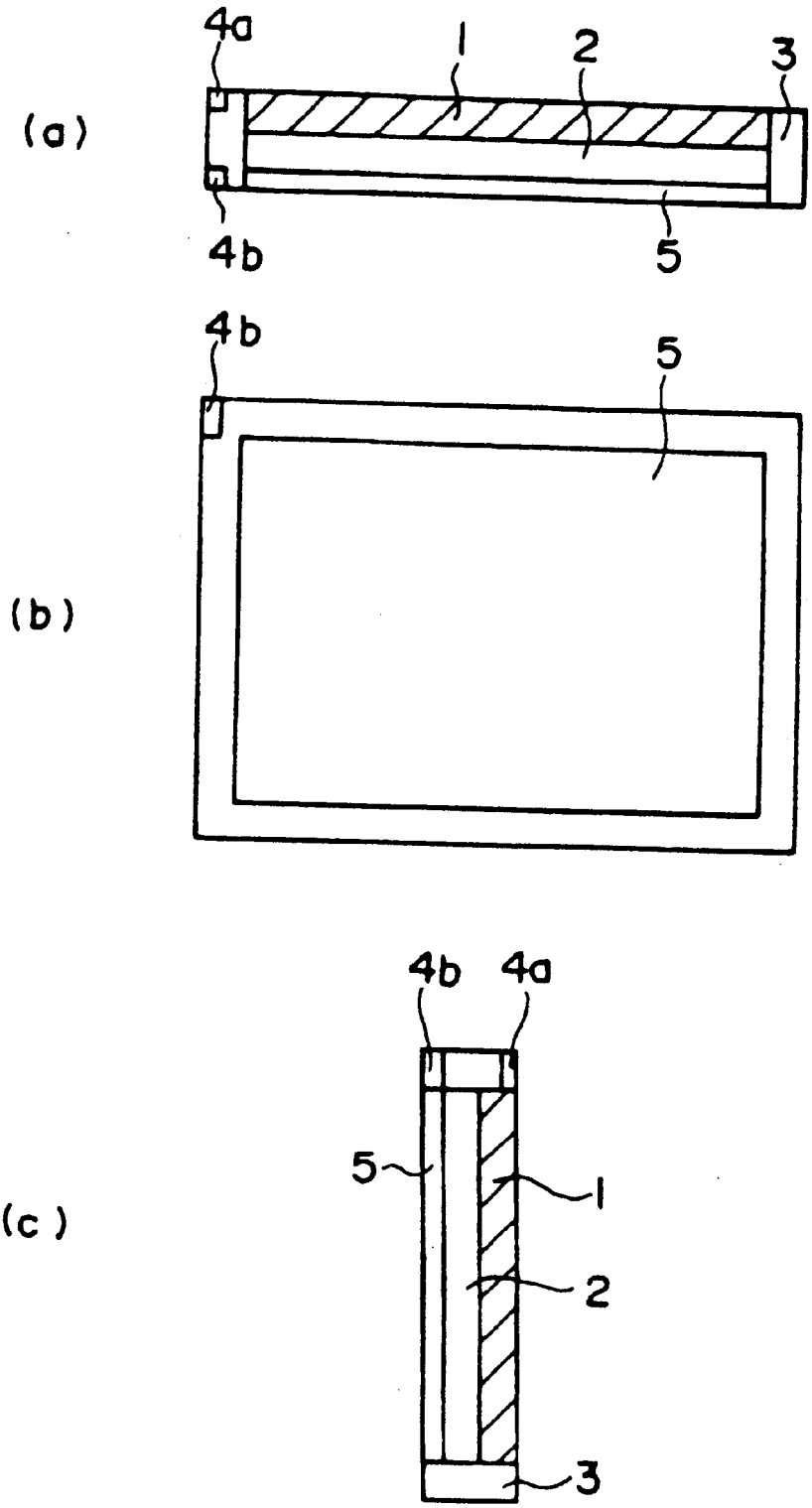
FIG. 8 is a simplified diagram showing the liquid crystal data display device according to embodiment 4.

The fourth embodiment according to the present invention will now be explained. Embodiment 4 is explained with reference to FIGS. 8 and 9. The liquid crystal display used in the embodiment is the same as that explained in embodiment 3, so detailed explanation thereof is omitted. In embodiment 4, the body 3 includes one illuminometer 4a mounted to the side of the liquid crystal panel 1, and another illuminometer 4b mounted to the side of the external light intake window 5.

Figure 9:
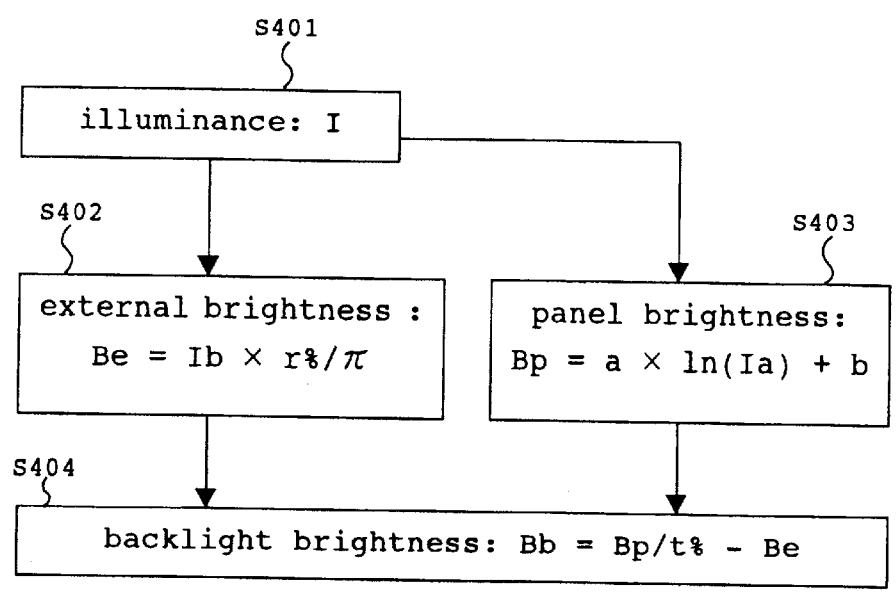
FIG. 9 is an explanatory view of the algorithm for controlling the backlight unit according to embodiment 4.

FIG. 9 is referred to in explaining the algorithm for determining the brightness Bb of the backlight unit based on illuminance Ia and Ib measured respectively by illuminometers 4a and 4b.

In S401, illuminometers 4a and 4b measure the ambient brightness, and obtain illuminance Ia and Ib.

In S402, external brightness Be is computed by Be=Ib×r %/π.

In S403, panel brightness Bp is computed by Bp=a×ln (Ia)+b, wherein 10≦a≦40, 50≦b≦250.

In S404, backlight brightness Bb is compute by Bb=Bp/t %−Be. Thereby, the values of optimal panel brightness Bp and backlight brightness Bb is obtained.

In embodiment 4, the external brightness Be is computed based on the illuminance Ib. Be is obtained by multiplying Ib by surface reflectivity r (%) and then dividing that by circular constant π. Value r includes the transmittance when light passes through the external light intake window, and is determined by the material of the window. Next, the panel brightness Bp is computed based on illuminance Ia so that the value is higher when the display is used under a luminous environment and is lower when the display is used indoors or under a dark environment. Bp can be expressed by a linear equation of the logarithm of the illuminance as follows; Bp=a×ln (Ia)+b. Further, Bp can be switched stepwise according to the illuminance. The backlight brightness Bb is obtained by dividing Bp by panel transmittance t (%) and then subtracting Be therefrom. The backlight unit is controlled to the value of Bb.

The fifth embodiment according to the present invention will now be explained. Embodiment 5 is explained with reference to FIG. 10. The liquid crystal display used in embodiment 5 is the same as that explained in embodiment 3, so detailed explanation thereof is omitted.

Figure 10:
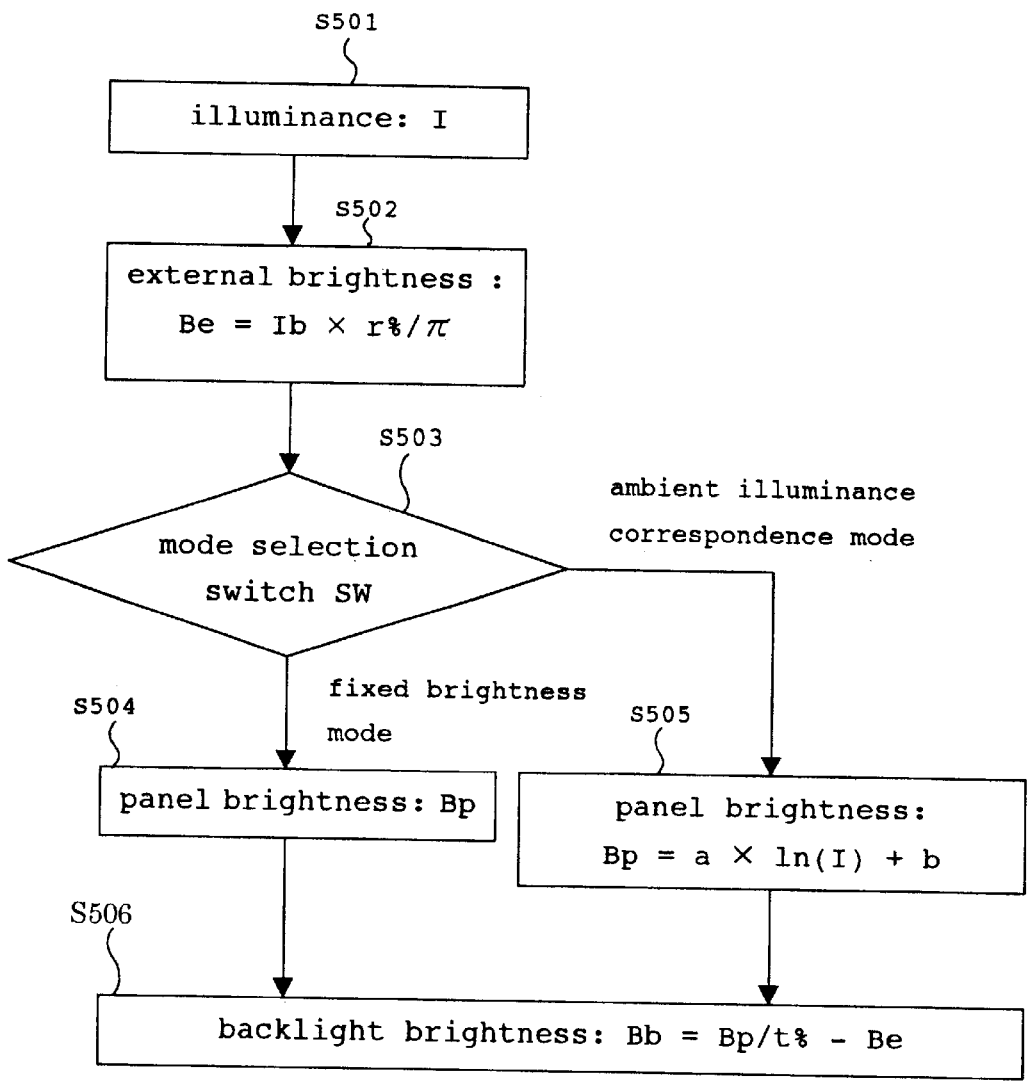
FIG. 10 is an explanatory view of the algorithm for controlling the backlight unit according to embodiment 5.

FIG. 10 is referred to in explaining the algorithm for determining the brightness Bb of the backlight unit based on illuminance I measured respectively by illuminometer 4.

In S501, illuminometer 4 measures the ambient brightness, and obtains illuminance I.

In S502, external brightness Be is computed by Be=I×r %/π.

In S503, based on the mode selection switch SW, when the mode is set to a fixed brightness mode, the procedure advances to S504, and when the mode is set to an ambient illuminance correspondence mode, the procedure advances to S505.

In S504, the panel brightness Bp is determined to a fixed value, and the procedure advances to S506.

In S505, panel brightness Bp is computed by Bp=a×ln (I)+b, wherein 10≦a≦40, 50≦b≦250.

In S506, backlight brightness Bb is compute by Bb=Bp/t %−Be. Thereby, the values of optimal panel brightness Bp and backlight brightness Bb is obtained.

In embodiment 5, the external brightness Be is computed based on illuminance I. Be is obtained by multiplying Ib by surface reflectivity r (%) and then dividing that by circular constant π. Value r includes the transmittance when light passes through the external light intake window, and is determined by the material of the window. Next, the switch SW is switched based on the selection of the user, and the method for obtaining Bb differs. First, when a fixed brightness mode is selected, the panel brightness Bp is either a preset value or a value set by the user, and the backlight brightness Bb is computed by dividing Bp by panel transmittance t (%) and then subtracting Be therefrom. The backlight unit is controlled to the value of Bb. On the other hand, when the ambient illuminance correspondence mode is selected, the panel brightness Bp is computed based on illuminance I so that the value is higher when the display is used under a luminous environment and is lower when the display is used indoors or under a dark environment. Bp can be expressed by a linear equation of the logarithm of the illuminance as follows; Bp=a×ln (I)+b. Further, Bp can be switched stepwise according to the illuminance. The backlight brightness Bb is obtained by dividing Bp by panel transmittance t (%) and then subtracting Be therefrom. The backlight unit is controlled to the value of Bb.

Figure 11:
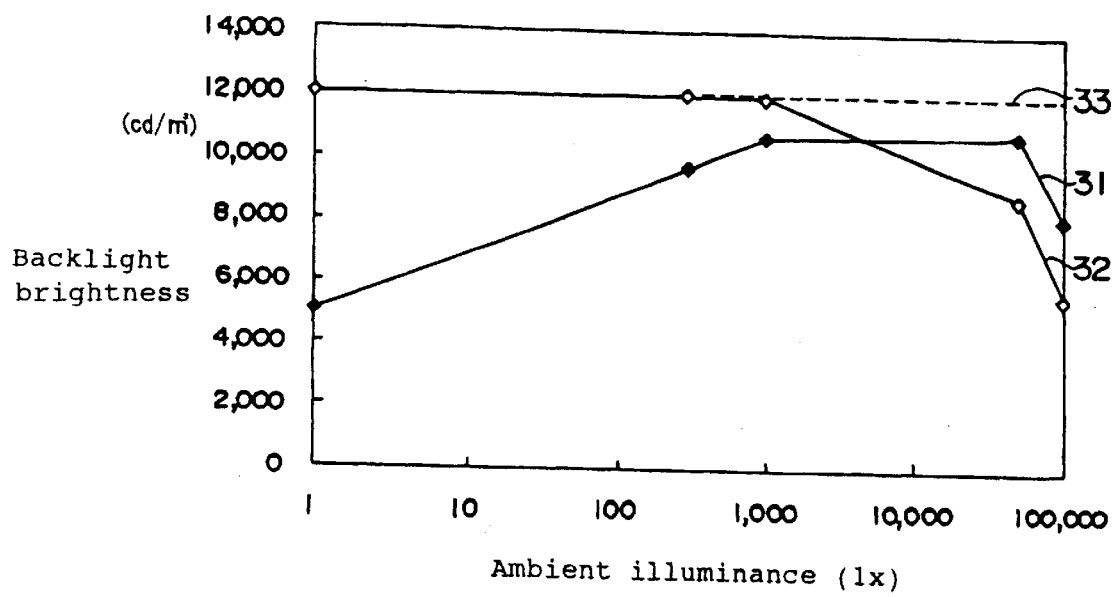
FIG. 11 is an explanatory view showing the actual relation between the ambient illuminance and the brightness of the backlight unit.
Figure 12:
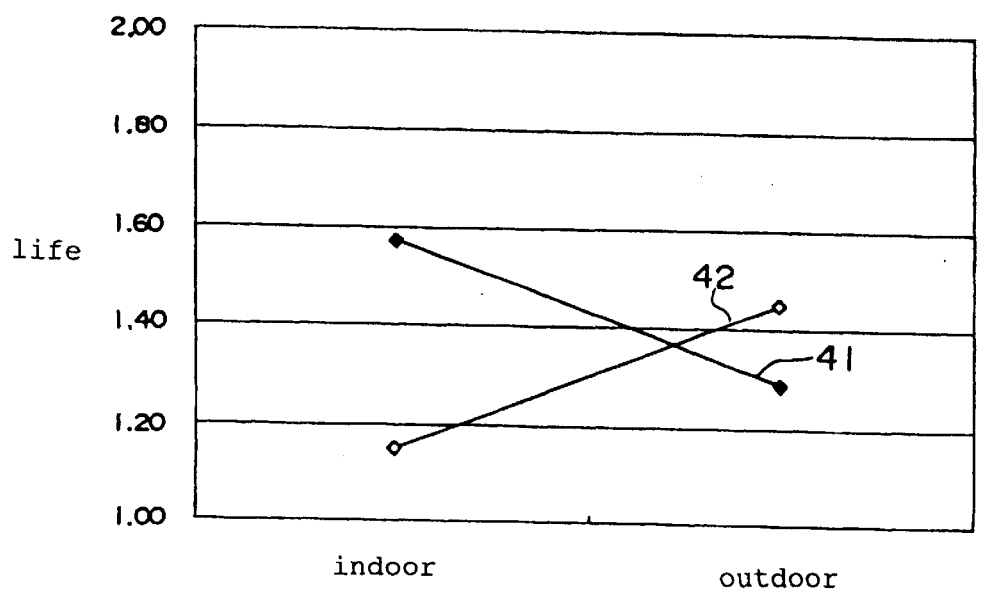
FIG. 12 is an explanatory view showing a comparison of the life of the liquid crystal data display devices.

One example of the relation between the ambient illuminance and the backlight brightness is shown in FIG. 11, where r=20%, t=3%, a=25, and b=150. The ambient illuminance correspondence mode 31, the fixed brightness mode 32, and the prior art example 33 are shown in the drawing. In the fixed brightness mode, Bp is assumed to be Bp=360 cd/m$^2$. Further, FIG. 12 shows the comparison between the life of the ambient illuminance correspondence mode and 41 and the fixed brightness mode 42, where it is assumed that the life is considered to be proportional to the product of time and illuminance, and the life of a prior-art liquid crystal display is set as "1". It is advantageous to use the ambient illuminance correspondence mode if the display is mainly used indoors or under a dark environment, and it is advantageous to use the fixed brightness mode when the display is mainly used under a luminous environment. Whichever mode is chosen, the life of the display is 1.2 to 1.6 times longer than that of the prior art.

Figure 13:
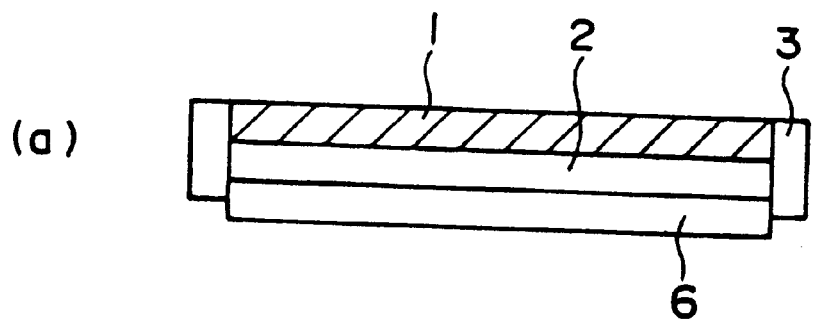
FIG. 13 is a simplified diagram showing the liquid crystal data display device according to embodiment 6.
Figure 13:
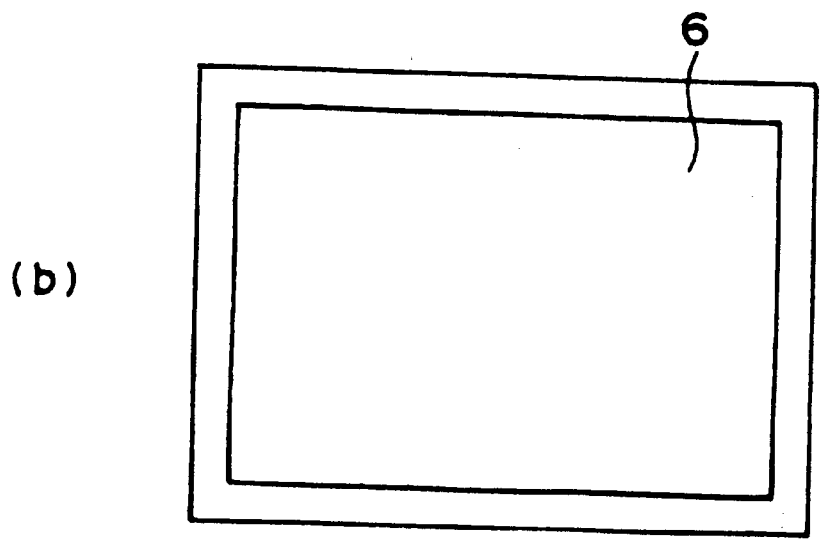
Figure 13:
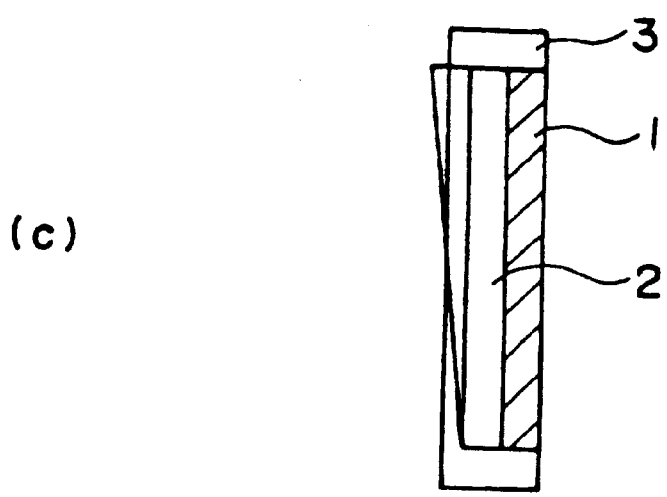

The sixth embodiment according to the present invention will now be explained. Embodiment 6 will be explained with reference to FIG. 13. The liquid crystal display according to embodiment 6, as shown in the upper cross-sectional view of FIG. 13 (*a*), comprises a liquid crystal panel 1 including a color filter, a TFT substrate, a liquid crystal material and a polarizing plate, a backlight unit 2, and a body 3 equipped with an external light intake window 6. FIG. 13 (*b*) and FIG. 13 (*c*) are the back view and the cross-sectional side view of FIG. 13 (*a*). The external light intake window 6 is made of a transparent material formed into a triangular prism or a trapezoidal prism where the upper area is thicker than the lower area. By use of this window, the external light from the upper area of the liquid crystal panel 1 can be effectively transmitted and condensed.

Figure 14:
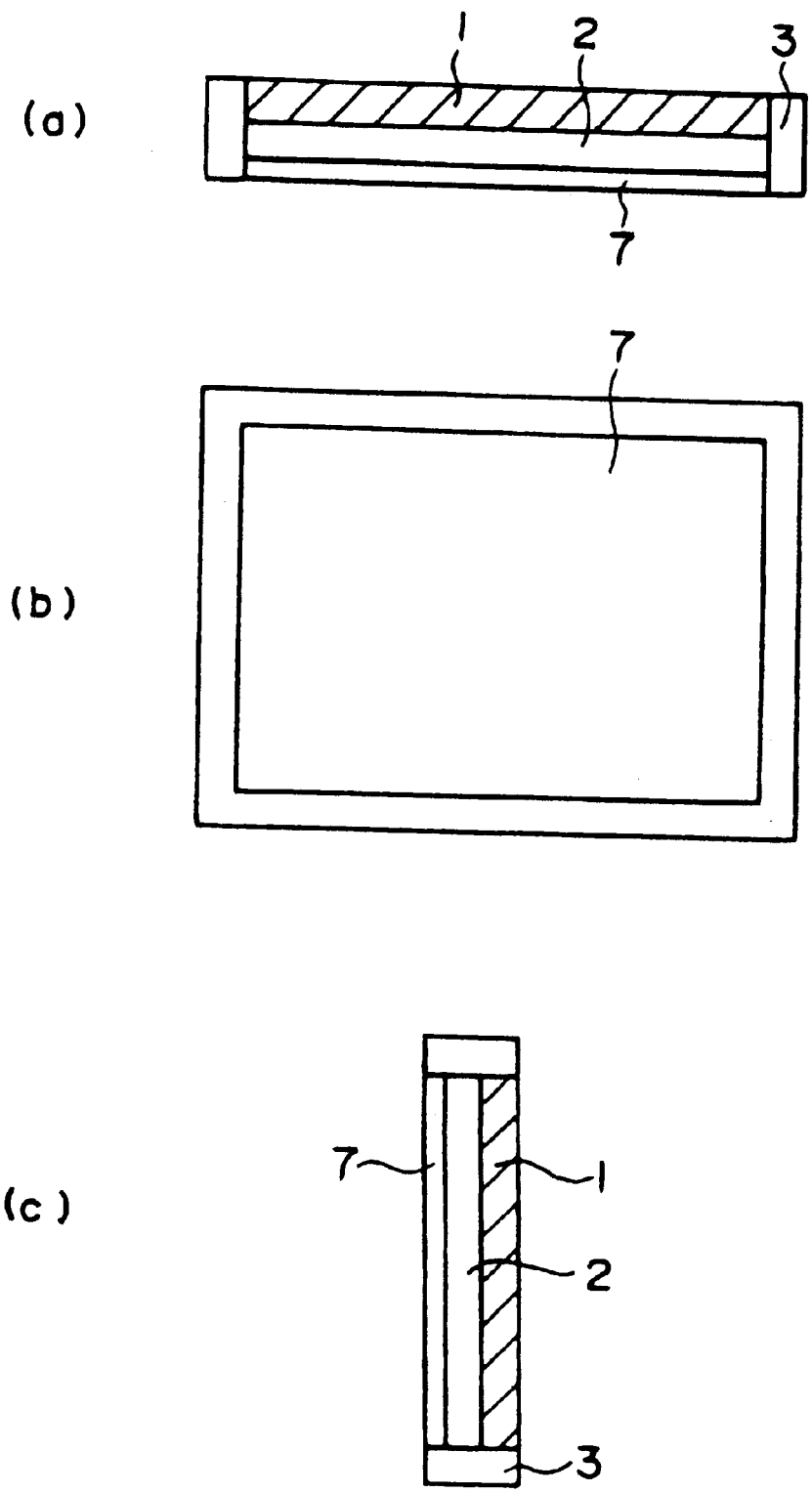
FIG. 14 is a simplified diagram showing the liquid crystal data display device according to embodiment 7.

The seventh embodiment according to the present invention will now be explained. Embodiment 7 is explained with reference to FIG. 14. As shown in the upper cross-sectional view of FIG. 14 (*a*), the liquid crystal display according to embodiment 7 comprises a liquid crystal panel 1 including a color filter, a TFT substrate, a liquid crystal material and a polarizing plate, a backlight unit 2, and a body 3 having an external light intake window 7. FIG. 14 (*b*) and FIG. 14 (*c*) are the back view and the cross-sectional side view of FIG. 14 (*a*). The external light intake window 7 is a half-mirror, which not only takes in external light, but enables to reflect and reuse the light either reflected or scattered by the backlight unit or emitted backwards from the fluorescent tube. The half-mirror can be manufactured by laminating thin films having various indexes of refraction. Further, the half-mirror can either be mounted to the back surface of the prismatic external light intake window as explained in embodiment 6, or can be tilted so that the hollow portion and the half-mirror function as a prism.

Figure 15:
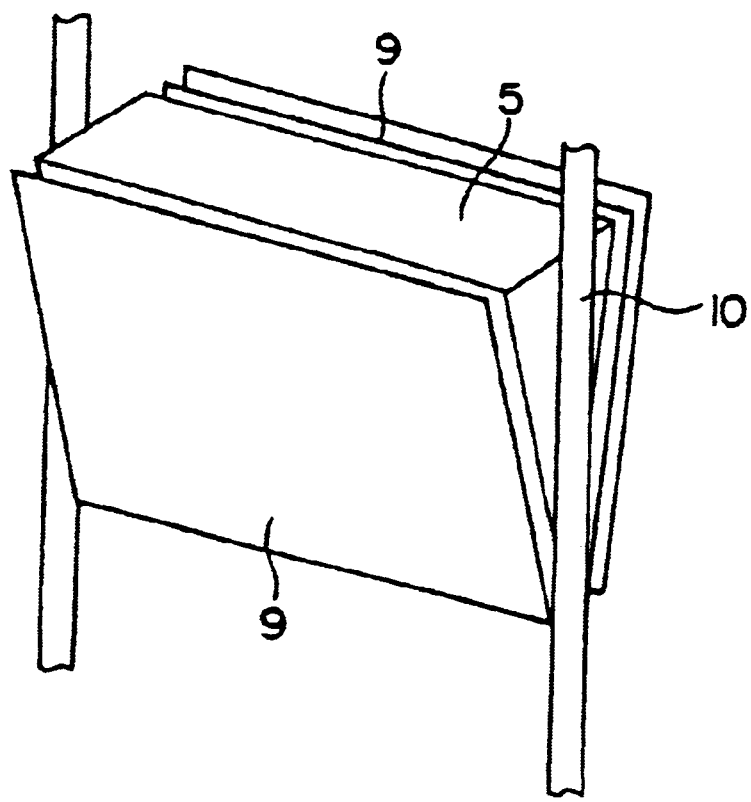
FIG. 15 is a simplified diagram showing the liquid crystal data display device according to embodiment 8.
Figure 16:
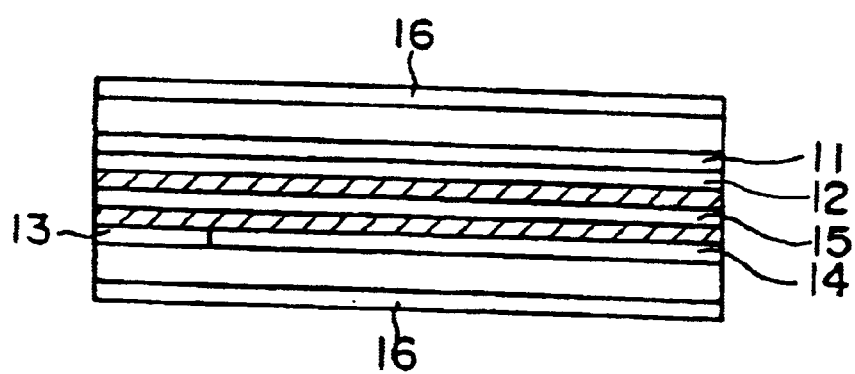
FIG. 16 is a simplified diagram of the prior-art liquid crystal panel.
Figure 17:
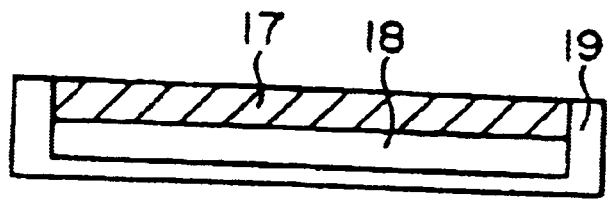
FIG. 17 is a simplified diagram showing the prior-art liquid crystal data display device.
Figure 17:
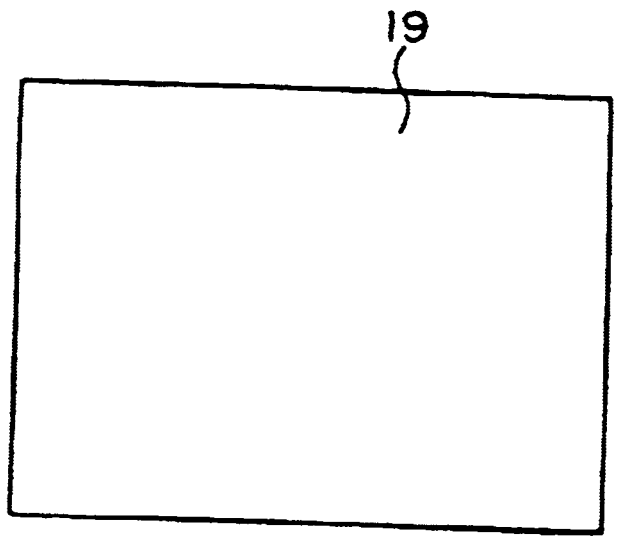
Figure 17:
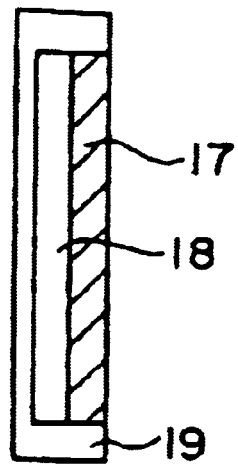
Figure 18:
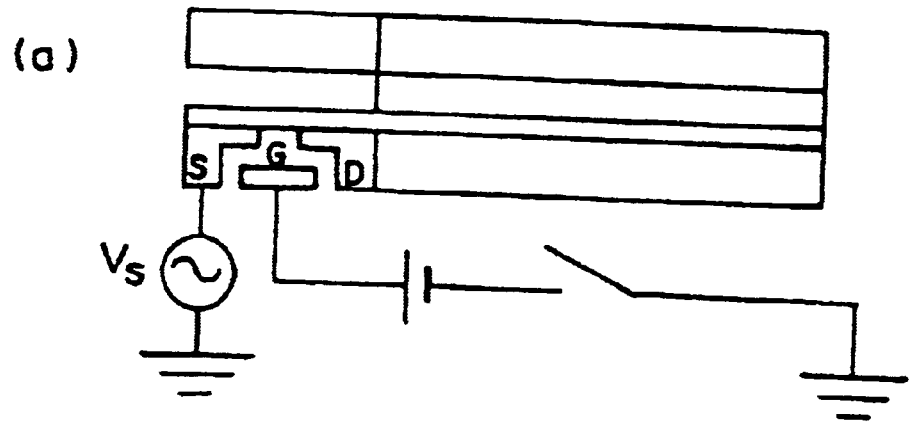
FIG. 18 is a simplified diagram explaining the driving mechanism of the prior-art liquid crystal data display device.
Figure 18:
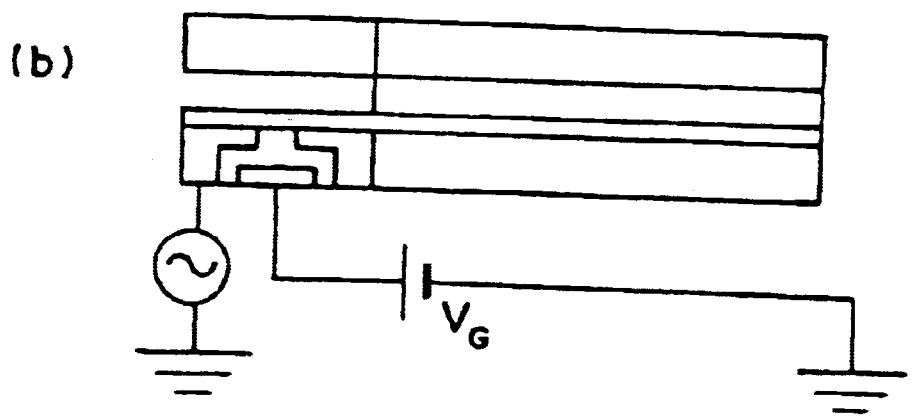

The eighth embodiment of the present invention will now be explained. Embodiment 8 is explained with reference to FIG. 15. The liquid crystal display according to embodiment 8 is identical to that explained in embodiment 5, and therefore detailed description thereof is omitted. Two liquid crystal displays are equipped with an external light intake window 9, and the whole structure is supported by a column 10. The external light intake window 9 is formed to effectively take in external light into the two liquid crystal displays, for example by functioning as a prism, or by being equipped with a half-mirror to the upper surface of the window. According to this embodiment, there is no need to design an external light intake window for each liquid crystal display. More over, the backlight unit can be controlled as explained above, but there is no need to perform a special control. The liquid crystal display according to the present embodiment is especially suited for outdoor uses.

As explained in the preferred embodiments above, a liquid crystal data display device having a liquid crystal panel unit and a backlight unit is further equipped with an illuminometer, and by controlling the backlight unit based on the ambient illuminance so that the average brightness of the panel is optimum, not only can the panel be set to have the most appropriate brightness, but also the life of the backlight unit is increased and the power consumption is cut down. Moreover, by providing a more actual numerical definition, the brightness of the panel can be controlled to a level most appropriate for the human eye.

Moreover, the liquid crystal data display device having a liquid crystal panel unit and a backlight unit is further equipped with an external light intake window positioned rearward of the backlight unit, thereby providing even further cut down of power consumption and improving the life of the backlight unit.

Moreover, by forming a device with plural liquid crystal panels, either the same number of or less backlight units, and either the same number of or less external light intake windows, the number of parts constituting the display can be reduced, which results in miniaturization of the device and cut-down on the manufacturing cost.

The present invention provides a liquid crystal data display device capable of controlling the liquid crystal panel to have the most appropriate brightness, while reducing the power consumption and improving the life of the backlight unit.

We claim:

1. A liquid crystal data display device comprising:
a liquid crystal panel unit, a backlight unit, and an illuminometer for measuring ambient illuminance, said display device further including:
means for computing panel brightness Bp (cd/m$^2$) based on the following equation when the ambient illuminance is I (1x):

$$Bp=z\times 1n(I)+b$$

wherein 10<a<40, and 50<b<250.

2. The liquid crystal data display device according to claim 1, wherein said backlight unit is controlled so that the panel brightness is set to the optimum value corresponding to the ambient illuminance.

3. The liquid crystal data display device according to claim 2, wherein said backlight unit is controlled so that the panel brightness is set stepwise to the optimum value corresponding to the ambient illuminance.

4. The liquid crystal data display device according to claim 3, further comprising:
when the panel brightness is represented by Bp (cd/m$^2$) and the ambient illuminance is represented by I (1x), a means for classifying I into $1\leq I<100$, $100\leq I<1,000$, $1,000\leq I<10,000$, and $10,000\leq I<100,000$ (1x); computing the Bp value at both end points (start point and end point) of each class by Bp=a×1n (I)+b, wherein $10\leq a\leq 40$ and $50\leq b\leq 250$; and computing the average value of these values to obtain the Bp value of each class.

5. The liquid crystal data display device according to claim 1, further equipped with a function for controlling said backlight unit so as to obtain a fixed panel brightness, and a function for controlling said backlight unit so that the panel brightness is set to the optimum value corresponding to the ambient illuminance, said device comprising a switch for selecting these two functions.

6. A liquid crystal data display device comprising:
a liquid crystal panel unit, a backlight unit, and an illuminometer for measuring ambient illuminance, said display device further including:
means for computing panel brightness Bp (cd/m$^2$) based on the following equation when the ambient illuminance is I (1x):

$$Bp=a\times 1n(I)+b$$

wherein 10>a<250; and
a plural number of illuminometers, and means for controlling said backlight unit so as to obtain a substantially uniform panel brightness throughout the screen.

7. A liquid crystal data display device comprising:
a liquid crystal panel unit, a backlight unit, and an illuminometer for measuring ambient illuminance, said display device further including:
means for computing panel brightness Bp (cd/m$^2$) based on the following equation when the ambient illuminance is I (1x):

$$Bp=a\times 1n(I)+b$$

wherein 10>a<250;
an external light intake window, and
means for controlling said backlight unit.

8. The liquid crystal data display device according to claim 7, wherein said external light intake window is a prismatic light conducting plate.

9. The liquid crystal data display device according to claim 7, wherein said external light intake window is a half-mirror.

10. A liquid crystal data display device comprising:
a liquid crystal panel unit, a backlight unit, and an illuminometer for measuring ambient illuminance, said display device further including:
means for computing panel brightness Bp (cd/m$^2$) based on the following equation when the ambient illuminance is I (1x):

$$Bp=a\times 1n(I)+b$$

wherein 10>a<250;
and a plural number of illuminometers mounted to the front surface and the back surface thereof for measuring the front-side ambient illuminance and the back-side ambient illuminance respectively, and a means for computing the panel brightness based on said front-surface ambient illuminance and controlling the backlight unit to obtain the desired panel brightness based on said back-surface ambient illuminance.

11. The liquid crystal data display device according to claim 10, further comprising a plural number of liquid crystal panels, backlight units, the number of which is equal to or smaller than the number of said liquid crystal panels, and external light intake windows, the number of which is equal to or smaller than the number of said liquid crystal panels.

* * * * *